Nov. 15, 1966 JEAN-JACQUES LAUPRETRE 3,286,104

VARIABLE-WIDTH TRANSISTOR PULSE GENERATOR EMPLOYING VARIABLE CAPACITIVE PHASE-SHIFT CIRCUIT FOR CONSECUTIVE SWITCHING OF TWO TUNNEL DIODES

Filed Jan. 2, 1964 2 Sheets-Sheet 1

United States Patent Office 3,286,104

Patented Nov. 15, 1966

3,286,104

VARIABLE-WIDTH TRANSISTOR PULSE GENERATOR EMPLOYING VARIABLE CAPACITIVE PHASE-SHIFT CIRCUIT FOR CONSECUTIVE SWITCHING OF TWO TUNNEL DIODES

Jean-Jacques Laupretre, Le Perreux sur Marne, France, assignor to Compagnie des Machines Bull (Société Anonyme), Paris, France Filed Jan. 2, 1964, Ser. No. 335,178
Claims priority, application France, Jan. 8, 1963, 920,761
5 Claims. (Cl. 307—88.5)

The present invention relates to generators for the production of pulses having a very high recurrence frequency, which may be employed in rapid information-processing equipment, in experimental laboratory installations and in any other similar applications.

There exist many applications in which there are required one or more generators producing rhythmic pulses and operating at a fixed frequency. It may be necessary for these generators to supply pulses of differing widths, although their recurrence frequency is fixed. It may also be desirable to vary, with a given generator, the width or duration of the pulses available at the output terminal, in a continuous manner within certain limits.

Hitherto, it has not been very difficult to design a generator producing pulses of variable width provided that their frequency has not exceeded 5 megacycles per second (5 mc./s.) The same is not the case when this frequency reaches or widely exceeds 10 mc./s. In this case, the circuit arrangements to be employed become complicated, delicate and costly. There are cases in which the adjustment of the form factor (or ratio of the duration to the cycle) of the pulse unduly disturbs the phase relations of the various generators, which may result in disadvantages.

The present invention has for its object to supply a pulse generator of the aforesaid type in which the variation of the duration of the pulses generated is obtained with simple and inexpensive means. Moreover, a number of these variable-width pulse generators may be fed from a common pilot generator without the adjustment of one of these generators affecting the adjustment of the others.

In accordance with the invention, the pulse generator comprises essentially a high-frequency transistor whose load resistance is inserted on the collector side, two tunnel diodes having their cathode connected to a fixed potential point, each of which may be triggered (i.e. suddenly changed from its so-called "low-voltage" state to its so-called "high-voltage" state), while the anode of the first diode is connected to the emitter of the transistor, and the anode of the second diode is connected to the base of the transistor. A phase-shifting network is provided which comprises a capacitor, of which one plate is connected to the said emitter, and a resistance of which one end is connected to the said base, the other terminals of these members being used to receive a fixed-frequency sinusoidal alternating voltage. The arrangement is so designed that at each positive half-cycle the first diode is first triggered by the current flowing through the capacitor, whereby the transistor is rendered conductive, and thereafter when the second diode is triggered in turn by the current flowing through the resistance it renders the transistor non-conductive again.

At least one of the members of the phase-shifting network is adjustable, preferably the capacitor, either for obtaining the desired pulse duration or for varying this duration within predetermined limits.

The width of the output pulse depends upon the characteristics of the tunnel diodes, the peak current of the first being advantageously made lower than that of the second, upon the respective values of the capacitor and of the resistance, and upon the alternating voltage supplied by the generator producing the sinusoidal wave at the recurrence frequency chosen for the pulses.

The operation of the pulse generator circuit utilises the phase difference existing between the currents flowing through the capacitor and the resistance, respectively, of the phase-shifting network, the current across the resistance normally lagging by a quarter of a cycle in relation to that flowing through the capacitor.

When it is necessary for the generator to supply the shortest possible pulses, a second capacitor is connected in parallel with the resistance of the phase shifter so as to produce the triggering of the second tunnel diode earlier in the operating cycle.

For a better understanding of the invention and the method by which it may be performed, the same will now be described, by way of example, with reference to accompanying drawings, in which.

It is first to be noted that the device, which will be called a pulse generator, is in fact a signal converter-shaper, since it is in itself dependent upon the true generator, which supplies an alternating voltage of fixed amplitude and frequency.

Figure 1:
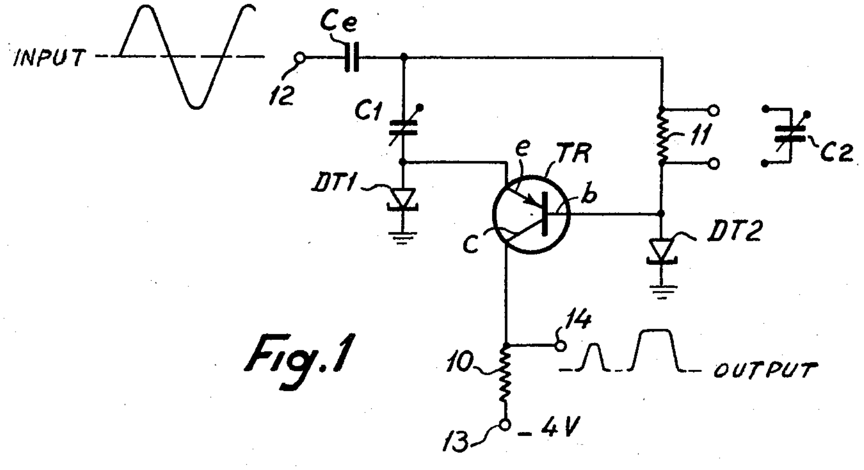
FIGURE 1 is a circuit diagram of the pulse-shaping generator.

It may be seen from FIGURE 1 that the said pulse generator is composed essentially of a transistor TR with its load resistance 10, a first tunnel diode DT1 and a second tunnel diode DT2.

Figure 2:
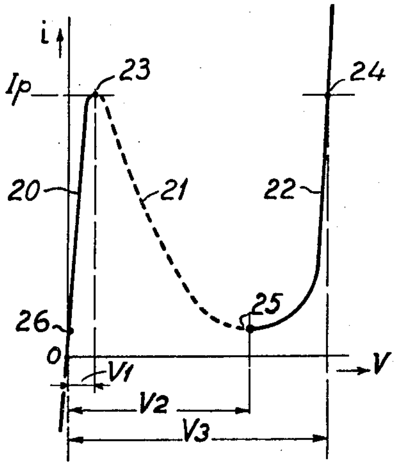
FIGURE 2 is a characteristic curve relating to the tunnel diodes employed.

The remarkable properties of a tunnel diode, also called an "Esaki diode," will be recapitulated with reference to the graph of FIGURE 2. With a bias in the forward direction, the current-voltage curve of such a diode has a portion 21 (chain-lined), called the negative resitsance portion, between two portions 20 and 22, called the positive-resistance portions. Generally speaking a certain type of diode has a peak current $I_p$ of well-defined value for a voltage V1 across its terminals. The valley voltage V2, corresponding to the lower trough of the curve, will be distinguished. Finally, the voltage V3 characterises that at which the current across the diode is equal to the peak current. It will hereinafter be stated that the diode "triggers" when, with increasing current, the operating point changes suddenly from 23 to 24.

When the voltage across the terminals of the diode extends from 0 to +V1, it is stated that it is in its "low-voltage" state. When this voltage exceeds the value of V2, it is stated that the diode is in its "high-voltage" state. If, starting with a voltage higher than V3, the current across the diode is caused to decrease progessively, the operating point passes through 24 and follows the descending portion 22 until the instant when the current reaches the valley point 25 and suddenly changes to 26, at which the voltage becomes substantially zero.

The tunnel diodes DT1 and DT2 have their cathode connected to earth. The anode of the diode DT1 is connected to the emitter *e* of the transistor TR and the anode of the diode DT2 is connected to the base *b* of the transistor. The phase-shifting circuit comprises two branches in parallel, which are completed by the condenser C1 and the resistance 11 respectively. The latter members are connected to a plate of the Capacitor C*e*, of which the other plate is connected to the input terminal 12. This terminal must be connected to the output terminal of a sinusoidal-voltage generator, which must be capable of supplying a sufficient power for feeding one or more pulse generators. Particulars on this subject will be given in the following.

The capacitor C*e* has a value which is sufficient for its reactance to be negligible at the operating frequency. Its function is merely to permit the shift of the direct-current voltage levels.

By way of example, some particulars regarding the parts employed with a view to a particular application are given, without any limiting character, but only for readily explaining the phenomena involved.

It will be assumed that the recurrence frequency of the pulses to be produced is 20 mc./s., their amplitude from 3 to 4 volts and their form factor variable from about 0.2 to 0.48.

The transistor TR is a germanium PNP transistor of the MADT type, dissipation 35 mw., cut-off frequency higher than 100 mc./s. The transistor 2N769 conforms to these characteristics.

The tunnel diode DT1 is characterized by a peak current I*p* of 10 ma., while the tunnel diode DT2 merely triggers at a current I*p* of 20 ma. For these two diodes, the voltages V1, V2 and V3 are equal and have the values 50 mv., 350 mv. and 500 mv. respectively. The value of the capacitor C*e* may be 10 nanofarads. C1 is an air-type adjustable capacitor of 3 to 30 picofarads. The value of each of the resistances 10 and 11 is 470 ohms. The terminal 13 is connected to the negative terminal of a D.C. voltage source, of which the value may be 4 volts. The pilot generator, of which the output is connected to the terminal 12, may be of any known type capable of supplying an alternating voltage whose maximum amplitude is 10 volts and whose frequency is 20 mc./s. Its output impedance must be sufficiently low for it to be regarded as a voltage source.

It will readily be appreciated from FIGURE 1 that the current which can flow through the capacitor C1 and the diode DT1 leads, in principle by a quarter-cycle, that which can flow through the resistance 11 and the diode DT2 in series. The principle applied consists in that the diode DT1 must, in the course of each positive half-cycle of the sinusoidal voltage, trigger first in order to render TR conductive, the diode DT2 being thereafter triggered in order to interrupt the conduction of the transistor.

Figure 3:
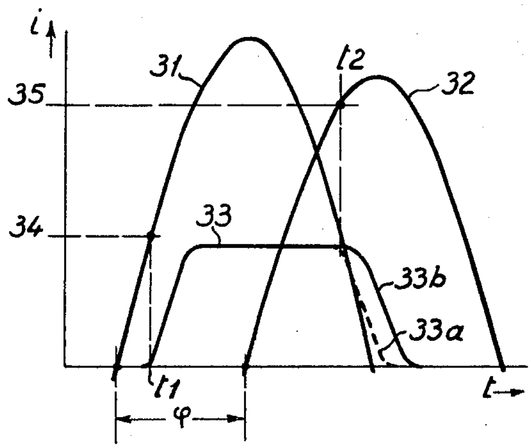
FIGURES 3 and 4 are two graphic representations of the currents and pulses produced, by means of which the operation of the device can be explained in detail.

Reference will now be made to FIGURES 1 and 3. It will be noted that in FIGURES 3 and 4 only the positive half-cycles have been shown. It is unnecessary to show the negative-half-cycles if it is borne in mind that during these half-cycles the voltages across the terminals of the diodes DT1 and DT2 are equal although very low, with the result that the voltage between the emitter *e* and the base *b* is zero or negligible, so that the transistor is non-conductive.

The curves shown in FIGURE 3 relate to an adjustment such that the duration of each pulse is maximum. The curve 31 is that of the current through the capacitor C1, the latter being adjusted to 20 pf. The curve 32 represents the current flowing through the resistance 11. The indication $\varphi$ represents the phase difference, equal to a quarter-cycle or 90°, between the two half-sinusoids 31 and 32. The curve 33 represents the collector current of TR and therefore in practice the shape of the output pulse available at the output terminal 14. The horizontal line 34 represents a current of 10 ma., corresponding to the peak current of the diode DT1. The horizontal line 35 represents a current of 20 ma. corresponding to the peak current of the diode DT2.

When at the instant *t*1 the curve 31 intersects the line 34, this means that DT1 is suddenly triggered, i.e. that the voltage across its terminals changes from 50 mv. to 500 mv. The emitter current of the transistor commences to increase because its base current can flow through the resistance 11, in which it is substituted for a small portion of the current flowing through DT2. The collector current through the resistance 10 rapidly increases and becomes stabilised at the maximum value permitted by this same resistance. The transistor TR is then highly saturated. When the current through the resistance 11 is reversed, the substantially constant base current is added thereto so as to flow through DT2 in the positive direction. In DT1, the strength of the current is the difference between the total current represented by 31 and emitter current.

Since the curve 32 represents the positive current flowing across the resistance 11, it may be assumed that it also represents the current flowing through the diode DT2 in the forward direction, if the additional current emanating from the base of the transistor is neglected. Under these conditions, at the instant *t*2, when the said current reaches 20 ma., the diode DT2 is triggered. Since at this instant the voltage across the terminals of DT1 has already fallen below V3, the emitter-base voltage of the transistor becomes zero, if not negative, so that the base current is interrupted. However, by reason of the high saturation of the transistor, the collector current is not immediately interrupted and the output pulse takes the form of the sloping line **33*b* instead of that of the sloping line 33*a***.

If it is desired to reduce the width of the output pulse, the capacitance of the capacitor C1 may be reduced. Since the reactance of the latter is then increased, the maximum amplitude of the capacitive current is reduced, the instant of the triggering of DT1 is retarded and the output pulse duration is accordingly reduced.

However, the reduction of C1, which affects only the maximum amplitude of the curve 31, does not always make it possible to obtain the desired shortening of the pulse width.

A second adjusting means has been provided by means of which it is possible to supply pulses whose duration is reduced to a minimum.

This means consists in the capacitor C2 illustrated in FIGURE 1, which is then connected in parallel with the resistance 11. This capacitor, which may be adjustable, has the effect of making it possible to reduce the relative delay of the current in DT2 as compared with that flowing through DT1.

Figure 4:
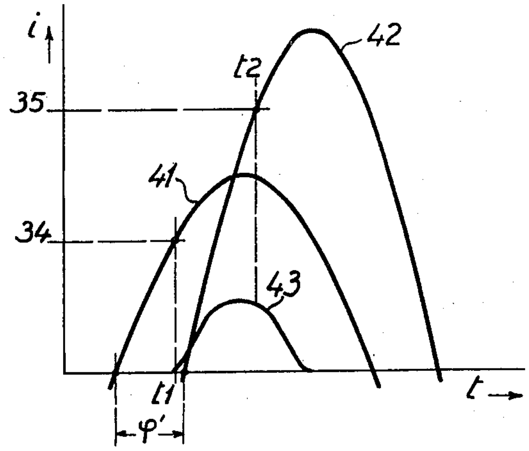

FIGURE 4, which has been drawn to the same scale as FIGURE 3, relates to this latter mode of operation. The curve 41 represents the current through the capacitor C1 if the latter is adjusted to about 12 pf. The curve 42 represents the current through the combination 11–C2 and therefore in practice the current through the diode DT2, for a value of C2 of 12 pf. It is unnecessary to reconsider the operation in detail. The output pulse has now the shape represented by the curve 43. Since the transistor is now less highly saturated, the rear flank does not lag so far after the instant *t*2, which is a favourable factor for the narrowness of the output pulse.

It may be observed that the influence of C2 makes itself felt by two cumulative effects. On the one hand, the maximum current through DT2 is increased, and on the other hand the phase difference $\varphi$ is considerably less than 90°. These two effects contribute to an advance of the instant of the triggering of the second diode DT2.

Since the pulse generator is generally followed by a power amplifier, it is always possible to provide means for clipping or level limiting. If this is done, there is normally no major disadvantage if, as in the present case, the amplitude of the supplied pulses varies a little with their width or duration.

In the particular example which has just been described, the minimum duration of the pulse may be in the neighbourhood of 10 nanoseconds, and the maximum duration 24 nanoseconds, the level being regarded as 10% of the maximum amplitude. With a cycle of 50 ns., this corresponds to a form factor continuously variable from 0.2 to 0.48. These same form factors are obtainable within a frequency range from 10 to 35 mc./s.

It is clear that, while it is desirable in some experimental applications to vary the pulse width in accordance with requirements, the capacitors C1 and C2 must be adjustable, and C2 must be adapted to be rapidly connected and disconnected. In addition, if a predetermined pulse width is desired, one of the two capacitors may be fixed and the other adjusted during the initial setting up, or periodically.

In addition to its ready adjustability, the pulse generator according to the invention has the advantage that the same sinusoidal voltage source may serve for feeding a number of pulse generators whose adjustments will be independent of one another. In particular, in order to obtain two pulse trains out of phase by 180°, it is sufficient for the output element of the sinusoidal generator to consist of the secondary winding of a transformer, this winding being provided with a centre tap connected to earth.

It is obvious that the values and specifications mentioned in the foregoing have no limiting character and that different values or elements may be adopted. It must be pointed out that the characteristics indicated for DT1 and DT2 are those of available tunnel diodes at the time of the setting up. It will be recalled that a ratio of 2 between the peak currents of the two diodes is by no means essential. One condition which must be observed, however, is that the peak current of the second diode DT2 should be sufficiently higher than that of the first diode DT1 if relatively wide pulses are to be produced. It appears that with a ratio of 1.5 the range of pulse widths is sufficiently large.

I claim:

1. A pulse generator arrangement for generating a voltage pulse for each positive halfwave of an H.–F. alternating voltage applied on an input terminal, with one transistor having emitter, base and collector electrodes and a load impedance connected in the collector side of the collector-emitter circuit, the arrangement including further: a first tunnel diode, a second tunnel diode, the cathodes of said diodes being directly connected to a reference potential terminal, the anode of the first diode being directly connected to the emitter of said transistor and the anode of the second diode being directly connected to the base of said transistor, a capacitor of adjustable capacitance connected between said input terminal and said emitter and a fixed resistor connected between said input terminal and said base, the capacitance of said capacitor being so set and the value of said resistor being so chosen that, both tunnel diodes operate in their low voltage state during each negative halfwave of the input signal, the first tunnel diode being switched to its high voltage operating state in advance of each positive halfwave of the input signal, thus causing the conduction of said transistor, and the second tunnel diode being switched later to its high voltage state for each positive halfwave, thus stopping the conduction of said transistor.

2. An arrangement as claimed in claim 1, wherein said second tunnel diode has a peak current value substantially greater than that of said first tunnel diode.

3. An arrangement as claimed in claim 1, wherein a second capacitor is connected across said resistor, to cause an advanced triggering of said second diode, so reducing the duration of each generated pulse.

4. A pulse generator arrangement for generating a voltage pulse for each positive halfwave of an H.–F. alternating voltage signal applied on an input terminal, with one transistor having a load impedance connected to its collector, the arrangement including further: a first tunnel diode, a second tunnel diode, said second diode having a peak current value substantially greater than that of said first diode, circuit means to connect the cathode of both said diodes to a reference potential terminal, circuit means to connect the anode of said first diode to the emitter of said transistor and to connect the anode of said second diode to the base of said transistor, a capacitor of adjustable capacitance connected between said input terminal and said emitter and a fixed resistor connected between said input terminal and said base, the capacitance of said capacitor being so set and the value of said resistor being so chosen that, both tunnel diodes operate in their low voltage state for each negative halfwave of the input signal, the first tunnel diode being switched to its high voltage operating state in advance to each positive halfwave of the input signal, thus causing the conduction of said transistor and the second tunnel diode being switched later in its high voltage state for each positive halfwave, thus stopping the conduction of said transistor, the duration of each output pulse generated being proportionate to the capacitance of said capacitor.

5. An arrangement as claimed in claim 4, wherein a second capacitor is connected across said resistor to reduce the duration of each generated voltage pulse.

References Cited by the Examiner

UNITED STATES PATENTS

| | | | |
|---|---|---|---|
| 3,191,065 | 6/1965 | Vargiu | 307—88.5 |
| 3,170,124 | 2/1965 | Candilis | 307—88.5 |
| 3,046,414 | 7/1962 | Meissen | 307—88.5 |

ARTHUR GAUSS, *Primary Examiner.*

J. HEYMAN, *Assistant Examiner.*